Dec. 3, 1940.	W. J. WACHOWITZ	2,223,648
METHOD OF PRODUCING WELDED METAL FITTINGS
Filed June 28, 1938	4 Sheets-Sheet 1
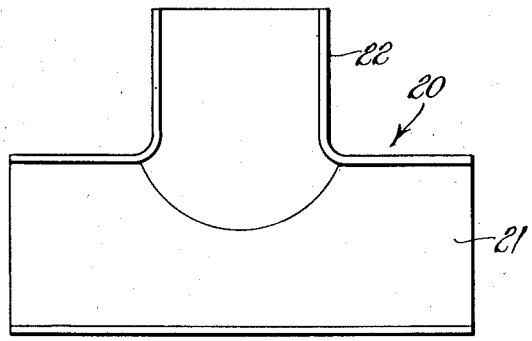
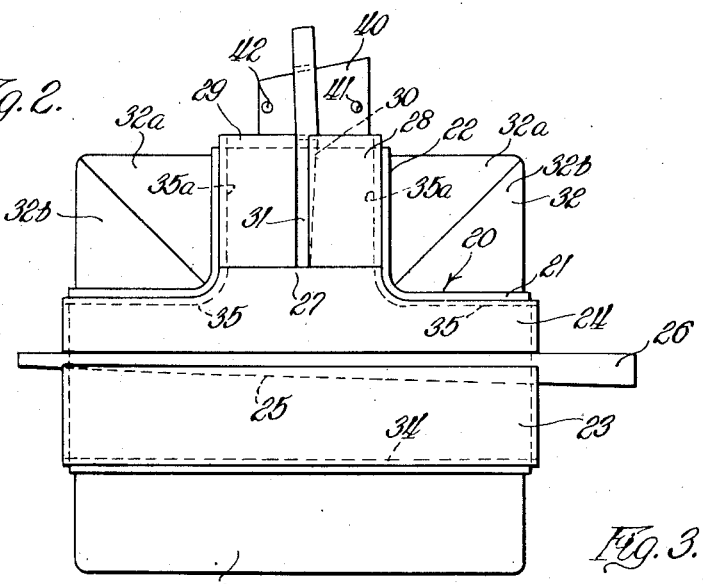
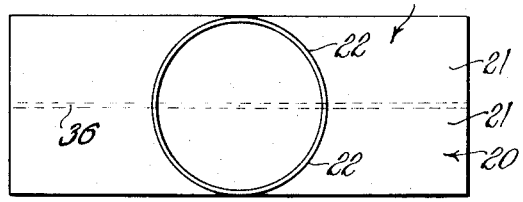
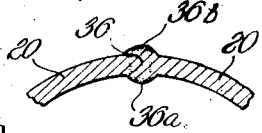
Inventor
Walter J. Wachowitz Dec. 3, 1940. W. J. WACHOWITZ 2,223,648
METHOD OF PRODUCING WELDED METAL FITTINGS
Filed June 28, 1938 4 Sheets-Sheet 2
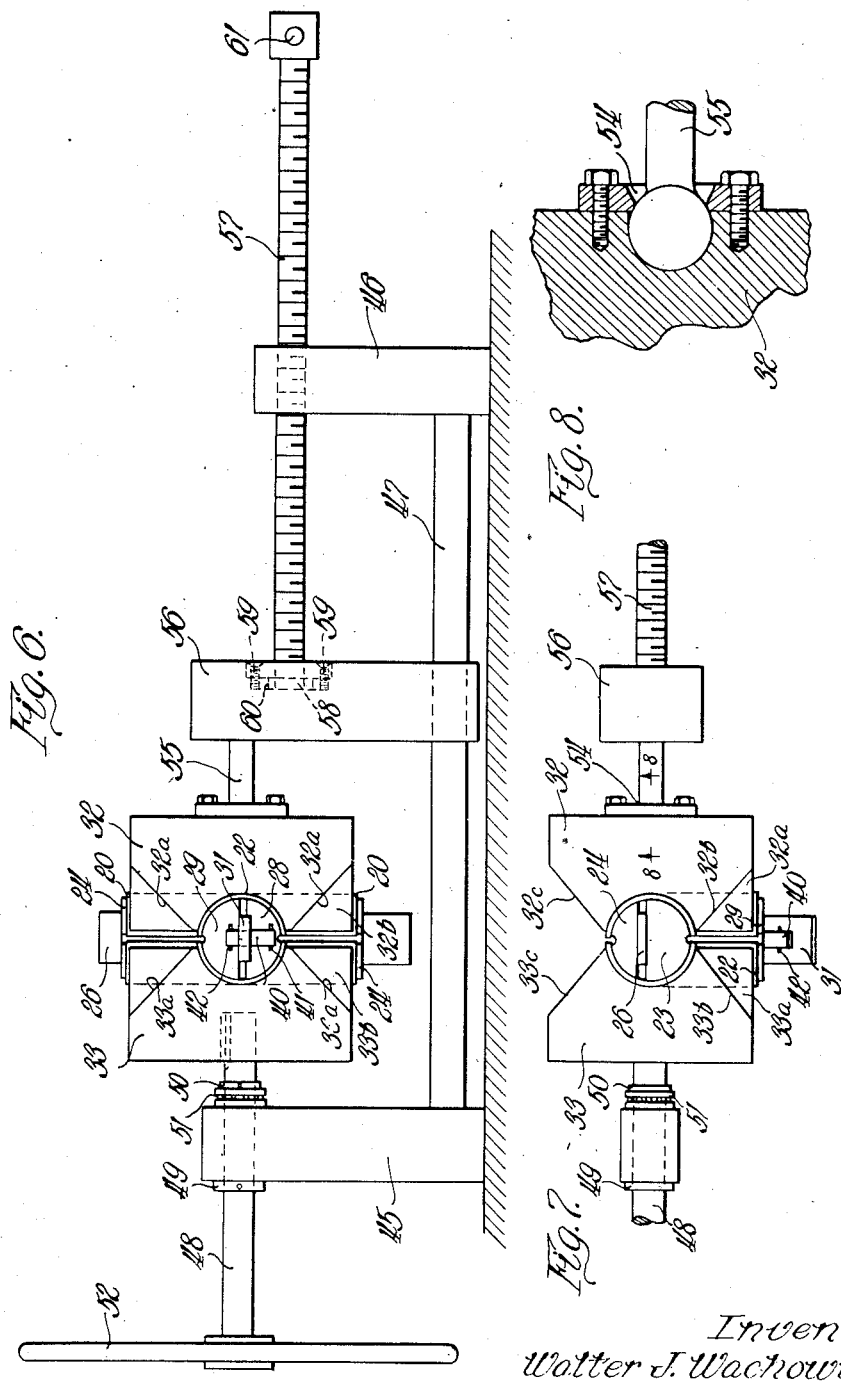
Inventor
Walter J. Wachowitz Dec. 3, 1940.   W. J. WACHOWITZ   2,223,648
METHOD OF PRODUCING WELDED METAL FITTINGS
Filed June 28, 1938   4 Sheets-Sheet 3
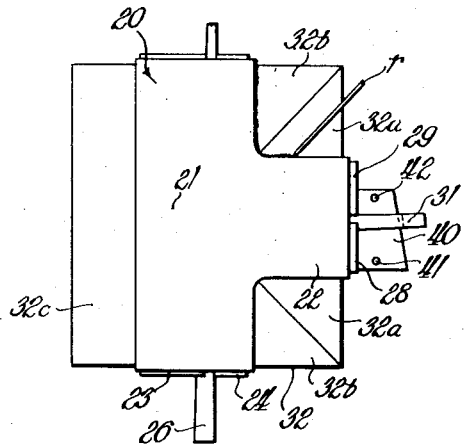
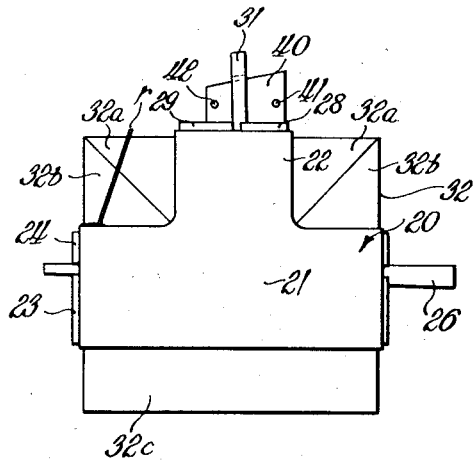
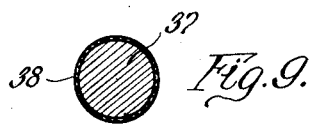
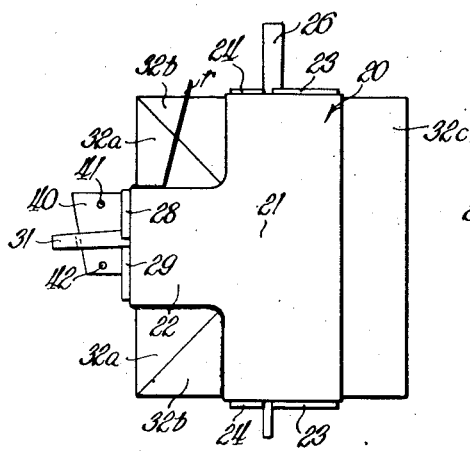
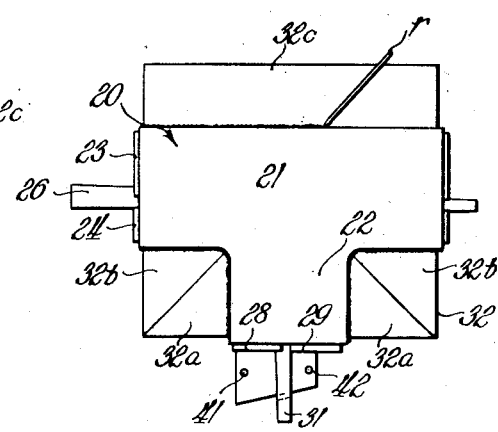
Inventor
Walter J. Wachowitz Dec. 3, 1940.   W. J. WACHOWITZ   2,223,648
METHOD OF PRODUCING WELDED METAL FITTINGS
Filed June 28, 1938   4 Sheets-Sheet 4

Inventor
Walter J. Wachowitz

Patented Dec. 3, 1940

2,223,648

UNITED STATES PATENT OFFICE 2,223,648

METHOD OF PRODUCING WELDED METAL FITTINGS

Walter J. Wachowitz, Waukesha, Wis.

Application June 28, 1938, Serial No. 216,339

2 Claims. (Cl. 29—157)

This invention relates to pipe fittings, and has to do with fittings intended for use in the handling of milk and milk products and like material.

In the handling of milk and milk products it is of importance that conduits through which the milk flows be free of obstructions such as would provide lodgement for foreign materials, bacteria or the like, for obvious reasons. Apparatus for handling milk frequently comprises pipe lines including associated fittings, such as elbows, T's and the like. While the pipes proper may be formed of forged or extruded metal and made to comply with the rigorous requirements with respect to the handling of milk and milk products, great difficulty has been encountered in providing fittings which meet such requirements. If the fittings be formed of cast metal they are apt to be more or less rough interiorly and to contain blow-holes or the like providing pockets for the lodgement of foreign materials and bacteria, rendering such fittings unsuited for their intended use. On the other hand, if the fittings be formed of forged sheet metal, by being made in sections welded together, difficulty is encountered due to the welding. It is known to form fittings in sections, by stamping from suitable blanks of sheet metal, the sections thus produced being welded together. It is the usual practice, in producing such fittings, to have the initial welded-in metal substantially equal in thickness to the wall of the fitting. During the welding operation a certain amount of slag is produced and, if a flux coated welding rod be used, as is common practice, a considerable amount of the flux enters into the weld metal. The slag and the flux constitute impurities or dross which forms a considerable percentage of the welded-in metal, with the result that the weld metal joining together the edges of the fitting sections contains impurities and is more or less porous. That is true even though the weld metal be ground down to a smooth finish, since the impurities referred to remain, in large part, within the body of weld metal joining together the edges of the fitting sections. A further objection to welding the fitting sections together in this manner is that the welded-in metal is not pure, containing impurities of the character referred to, with the result that electrolytic action is apt to occur between the impure welded-in metal and the metal of the fitting sections, due to the presence of lactic acid or other acids in the materials being handled, such electrolytic action resulting, within a comparatively short time, in the formation of pits or pockets in the interior surface of the fitting, providing lodgement for bacteria and other foreign material. Accordingly, fittings formed of sections produced from forged metal and welded together are not satisfactory for use in the handling of milk and milk products, and other materials requiring that the conduits through which they pass be free of all obstructions, pits, pockets or the like such as would provide lodgement for bacteria and foreign materials; if known welding be used.

My invention is directed to the provision of a fitting formed from sections of forged metal welded together in such manner that the welded-in metal is pure, free of all foreign substances and without pits or pockets such as would provide lodgement for bacteria or other foreign materials. More specifically, I weld the sections of the fitting together in a novel manner such that excess of weld metal is produced in amount sufficient to assure that all of the dross produced incident to the welding operation is moved, by the weld metal, beyond the inner and the outer surfaces of the fitting sections, leaving pure and non-porous weld metal between the edges of the sections, the excess weld metal being then ground away thus removing all impurities from the remaining weld metal, the edges of the fitting sections being then integrally united by a body of weld metal which, as noted, is pure and non-porous. I also provide means for clamping the sections of the fitting in assembled relation, with the edges of the sections spaced apart and the edge portions thereof accessible for welding, the clamping means being mounted for turning in a manner to permit of the welding operation being performed with expedition and facility. In connection with the clamping means I provide a form or core conforming to the interior of the assembled fitting and of a character to permit of welding together of the fitting sections with excess weld metal, in the manner and for the purposes referred to. Further objects and advantages of my invention will appear from the detail description.

In the drawings:

Figure 1 is an inner side view of one-half of a T, produced from forged metal, intended for use in producing a fitting in accordance with my invention;

Figure 2 is an inner face view of one of the clamping blocks, with the fitting section of Figure 1 mounted therein and an interior form or core constructed in accordance with my invention mounted within the fitting section;

Figure 3 is a fragmentary transverse sectional view, on an enlarged scale, of a fitting produced in accordance with my invention, showing the two sections of the fitting welded together with excess weld metal extending beyond the inner and the outer surfaces of the fitting;

Figure 4 is a view similar to Figure 3 after the excess weld metal has been ground away;

Figure 5 is a plan view of a T produced in accordance with my invention;

Figure 6 is a side view of the means for clamping the fitting sections in assembled relation and supporting them for turning movement during the welding operation;

Figure 7 is a plan view, with certain parts broken away, of the clamping and supporting means of Figure 6;

Figure 8 is a detail fragmentary sectional view taken substantially on line 8—8 of Figure 7, on an enlarged scale;

Figure 9 is a transverse sectional view, on an enlarged scale, through the welding rod;

Figure 14:
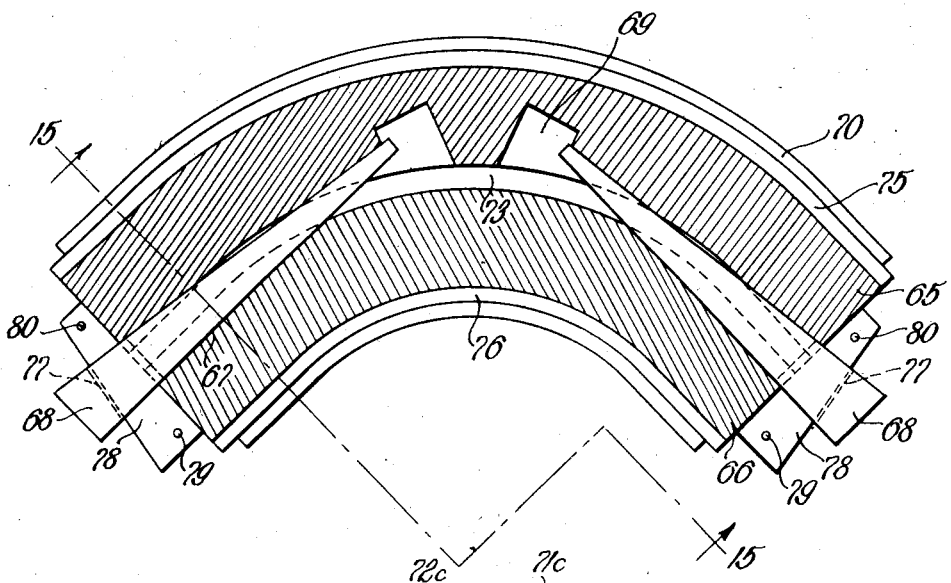
Figure 15:
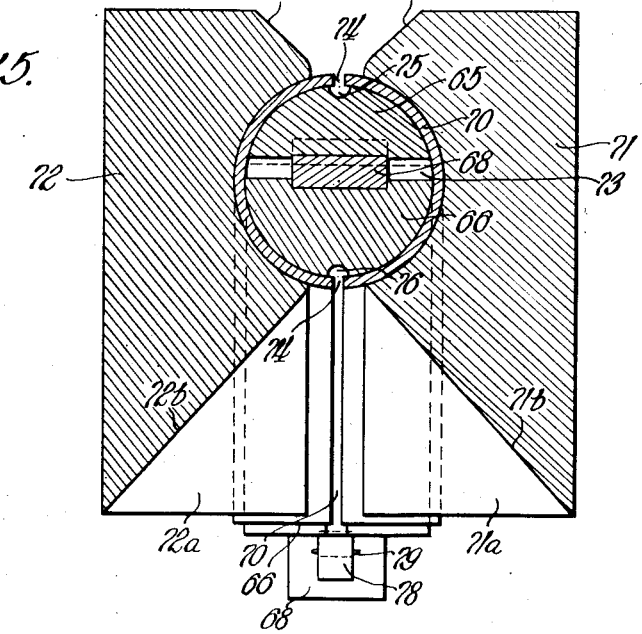

Figures 10 to 13, inclusive, are inner face views of one of the clamping blocks with a fitting mounted therein, showing the various positions into which the fitting may be turned during the welding operation;

Figure 14 is a central lengthwise sectional view through a core used in producing elbows, constructed in accordance with my invention, disposed within one section of an elbow; and Figure 15 is a sectional view taken substantially on line 15—15 of Figure 14, on a reduced scale, showing the two sections of the elbow clamped in assembled relation between two clamping blocks and a core within the elbow.

In producing a T in accordance with my invention I first cut from sheet metal of suitable gauge, in a known manner, appropriate blanks of T-form. Where the fitting is to be used for handling milk and milk products, the metal used is of such character as to be resistant to the materials being handled. That is true whether the materials handled are milk or milk products or other materials which tend to attack certain metals. The metal which I preferably use in producing fittings for handling milk and milk products is a stainless steel alloy known commercially as "Alleghany metal." The blanks thus produced are then formed in dies, or in any other suitable manner, into fitting sections, each section conveniently constituting one-half of the desired fitting. In Figure 1 I have illustrated a fitting section 20 conforming to one-half of a T, this section comprising a semi-cylindrical body 21 from which projects an integral semi-cylindrical neck 22.

In producing T's two fitting sections 20 are disposed in opposing edgewise relation with edges spaced apart an appropriate distance, and are then butt welded together. The fitting sections 20 are disposed about an expandible and collapsible form or core comprising a cylindrical body formed in two sections 23 and 24 separated lengthwise of the body by a space between such sections. The body of the core, when the latter is expanded, conforms to the interior of the body of the fitting as defined by the sections 20 when the latter are in assembled relation. The opposed faces of sections 23 and 24 of the core body are flat and section 23 is provided with a central lengthwise extending tapering groove 25 which receives a wedge 26, one face of this wedge bearing upon the wall at the bottom of groove 25 and the other face of the wedge bearing against the flat face of section 24. The latter section is provided at its mid-portion with a cylindrical radial projection 27 adapted to fit snugly within the inner portion of the neck of the fitting, defined by the necks 22 of the assembled fitting sections. The core also comprises a neck portion formed in two sections 28 and 29 separated lengthwise by a space therebetween, the opposed faces of these two sections being flat and section 28 being provided with a central lengthwise tapering groove 30 which receives a wedge 31. One face of wedge 31 bears upon the wall at the bottom of groove 30, the other face of this wedge bearing against the opposed flat face of section 29.

The assembled fitting sections and core are clamped in assembled relation between two opposed clamping blocks 32 and 33 each provided, in its inner face, with a recess conforming to one of the fitting sections 20 but of such depth that the edge portions of the fitting section project a short distance beyond the face of the blocks.

For purposes of description, the portion of the respective blocks which receives the neck of the fitting may be considered as the top of the blocks, the opposite portions being considered the bottom of the blocks, and the faces of the blocks at the ends of the body of the fitting may be considered as the ends of the blocks. Referring now to Figure 2, block 32 is provided with beveled surfaces 32ª of approximately triangular outline which are inclined outward toward the ends of the block from the opposite sides of the neck portion of the recess, and with triangular shaped beveled surfaces 32ᵇ which are inclined upward and outward from the end portions of the recess in the block which receives the body of the fitting, the surfaces 32ᵇ extending to the bases of the surfaces 32ª. Block 32 is further provided, at its lower portion, with a beveled surface 32ᶜ inclined downward and outward from the portion of the recess which receives the body portion of the fitting. Block 33 is provided with inclined surfaces 33ª, 33ᵇ and 33ᶜ corresponding to surfaces 32ª, 32ᵇ and 32ᶜ, respectively, of block 32.

Suitable means, to be hereinafter described, is provided for imparting relative movement to the clamping blocks one toward and away from the other, effective for clamping between them, in assembled relation, the fitting sections and the core. After the fitting sections have been clamped in position within the blocks and about the core, in the manner described, the wedges 26 and 31 are driven in tight so that the core sections are pressed tightly into contact with the fitting sections. The cross sectional area of the core, in the expanded condition of the body and neck portions thereof, is such that the adjacent edges of the fitting sections are spaced apart a distance approximately equal to the wall thickness of such sections, as shown in Figures 6 and 7. Referring to Figure 2, and to Figures 6 and 7, section 23 of the fitting body core is provided, at its lower portion, with a lengthwise outwardly opening groove 34 which underlies the space between the lower edges of the fitting sections, this groove being of greater width than the space referred to. Section 24 of the core is provided, at its upper portion, with two grooves 35 extending therefrom and upward along projection 27 at opposite sides thereof, these grooves underlying the spaces between the adjacent edges of the upper portions of the fitting sections defining the body of the fitting, as well as the spaces between the fitting section edges at the base portion or fillet of the neck of the fitting. Sections 28 and 29 of the neck portion of the core are each provided with a lengthwise extending groove 35ª in register at its lower end with groove 35 and underlying the spaces between the adjacent edges of the necks 22 of the fitting sections 20, grooves 35ª, like grooves 35, being of appreciably greater width than the spaces which they underlie.

When the fitting sections have been assembled and clamped in assembled relation, about the core and in the clamping blocks, the edges of the fitting sections are spaced apart and the edge portions thereof project inward beyond the opposed spaces of the clamping blocks, between which they are readily accessible for welding, as will be clear from Figures 6 and 7. The edges of the fitting sections are then butt welded together, conveniently by means of a welding rod such as that shown in Figure 9. This welding rod comprises a core or rod 37 formed of the same metal as that of the fitting sections, in this case stainless steel, and an outer coating or covering 38 of a suitable flux to facilitate the welding operation and reduce oxidation. During the welding operation a certain amount of slag is produced and a certain amount of the flux from the welding rod enters, with the slag, into the weld metal. If just sufficient weld metal were used to fill the space between the adjacent edges of the fitting sections, this slag and flux, which constitute impurities and may be classed as dross, would be included in the weld metal joining together the edges of the fitting sections. That would render the weld metal more or less porous and impure, which is objectionable for the reasons previously noted. In order to avoid that, excess weld metal is used in such amount that the excess projects beyond the inner and the outer surfaces of the fitting, as at 36ª and 36ᵇ, respectively, in Figure 3. During the welding operation the welded-in metal is in fused or liquid condition and the contained impurities, such as the flux and slag, are moved to the outer regions of the weld metal by the action thereof. Accordingly, such impurities are moved outward beyond the inner and the outer surfaces of the fitting, with the excess weld metal, the impurities being indicated by the stippling in Figure 3. This leaves the adjacent edge portions of the fitting sections united by a body of pure weld metal 36 which is non-porous, contains no impurities and is of the same character as the metal of the fitting sections. After the sections have thus been welded together the excess weld metal is ground away, removing the contained impurities and leaving the fitting sections united by a body of weld metal which, being pure and non-porous, contains no openings capable of providing lodgement for bacteria and, since it is of the same character as the metal of the fitting sections, it avoids objectionable electrolytic action due to the presence of acids or analogous agents contained in the material being handled. The fitting, after completion of the welding and grinding operations, appears as in Figure 5 and, in effect, is a unitary one piece fitting, the welded-in metal not being detectable from the metal of the united fitting sections. The fitting thus produced may be mounted in the pipe line in which it is to be used in any appropriate manner.

After the fitting sections have been welded together, in the manner above described, the wedges 26 and 31 may be removed, permitting removal of the sections of the form or core. Conveniently, the wedges are removed while the fitting is clamped between the blocks, though that is not essential. It will be noted from Figure 2 that wedge 26 is of such length that the smaller end thereof projects an appreciable distance beyond the corresponding end of the body portion of the core, comprising the sections 23 and 24. This projecting end of wedge 26 may be struck by a hammer or other tool for driving wedge 26 out of the core. Wedge 31 projects a considerable distance outward beyond sections 28 and 29 of the neck core and is provided with an opening which receives a wedge plate 40, provided with stop pins 41 and 42, this plate bearing upon the upper ends of core sections 28 and 29. By driving plate 40 through wedge 31, the latter is withdrawn from sections 28 and 29 sufficiently to permit of its ready removal, the opening through which plate 40 operates being of appropriate extent to that end. Preferably wedge 31 is removed prior to removal of wedge 26, though that is not essential. After the wedges have been removed, the sections of the core may readily be removed from within the fitting, in an obvious manner.

The clamping blocks 32 and 33 are preferably so mounted that they may be turned as a unit, together with the assembled fitting sections and associated core, with a view to facilitating the welding operation. In Figures 6, 7 and 8 I have shown supporting and clamping means suitable to that end. This means comprises two relatively fixed uprights 45 and 46 connected by a guide member 47. A shaft 48 is rotatably mounted through the upright or standard 45 and is confined against endwise movement therethrough by means of stop collars 49 and 50 suitably secured upon the shaft, there being a ballbearing structure 51 interposed between collar 50 and standard 45 to facilitate rotation of shaft 48. A hand wheel 52 is suitably secured upon the outer end of shaft 48 for convenience in rotating the latter. Clamping block 33 is keyed or otherwise suitably mounted upon the inner end of shaft 48 for rotation therewith.

Clamping block 32 is mounted for universal movement, by ball and socket means 54 (Figure 8) of known type, upon the inner end of a stub shaft 55 carried by a support 66 slidably mounted, at its lower end, on guide member 47. A screw shaft 57 threads through the upper end of standard 46 and is rotatably connected, at its inner end, to support 56 in a known manner, conveniently by means of a collar 58 secured upon the inner end of shaft 57 and extending into a recess in support 56, collar 58 being confined against outward movement by means of a ring 59 appropriately secured, as by means of screws 60, in an outer recess in support 56. Shaft 57 may be connected to support 56 in any other suitable manner. At its outer end shaft 57 is provided with a suitable handle 61 for convenience in rotating it. Stub shaft 55 is disposed coaxially with shaft 48, the clamping blocks 32 and 33 being thus mounted for rotation about a common axis.

The fitting sections and the associated core are disposed in assembled relation within the recesses in the clamping blocks, after which block 32 is forced toward block 33, by means of the screw shaft 57, thus clamping the assembly between the blocks. The fitting sections are then welded together by means of a welding rod r, such as the rod of Figure 9. During the welding operation the blocks may be turned, conveniently by means of hand wheel 52, into various positions for facilitating the welding operation. Referring to Figures 10 to 13, inclusive, the blocks are shown in such position that the neck of the fitting is directed upwardly, it being assumed that the operator is at the right hand of the blocks and the welding is started at the left hand end of the upper portion of the fitting. After the welding has progressed from the left hand end of the fitting, as viewed in Figure 10, to the base of the neck of the fitting, the blocks may be turned an angle of 90° such that the neck is disposed substantially horizontal, the welding operation continuing along the neck. The blocks may then be turned counterclockwise, as viewed in Figure 11, through 180° to the position shown in Figure 12, in which position the other side of the neck may be welded, after which the blocks may be turned clockwise, as viewed in Figure 12, through 90°, so that the unwelded upper portion of the body of the fitting is horizontal, the welding being then continued to the end of the upper portion of the body. After the neck and the upper portion of the body of the fitting have been welded, the blocks may be turned so as to dispose the fitting as in Figure 13, the sections of the fitting being then welded together at the side thereof opposite to the neck, as indicated. It will be seen that the assembled fitting sections are thus supported, by means of the clamping blocks and associated elements, in such manner that they can readily be turned into various positions for facilitating the welding operation. It will be understood that the positions of the fitting shown in Figures 10 to 13, inclusive, are illustrative only and that the fitting may be turned into various positions, to suit the convenience of the operator, during the welding operation.

In Figures 14 and 15 I have illustrated the manner of assembling and supporting two sections of an elbow for welding together thereof. This means comprises a core formed in two sections 65 and 66 substantially conforming to the interior of the elbow and provided, at their end portions, with opposed flat surfaces. Section 66 is provided with a groove 67 in each flat surface at the end portion thereof, which groove receives a wedge 68 one side of which bears upon the wall at the bottom of groove 67, the other side of the wedge bearing against the flat surface of section 65. The latter section is provided with two recesses 69 for reception of the inner end portions of wedges 68. Two fitting sections 70, each conforming to one-half of the desired elbow, are disposed about the core, the assembly being clamped between clamping blocks 71 and 72. Each of these blocks is provided with a recess, in its inner face, which receives one of the fitting sections, the depth of the recess being such that the edge portions of the fitting sections project inward beyond the face of the block, as in Figure 15. When the assembly has been clamped between the blocks, the wedges 68 are driven in, forcing the sections 65 and 66 of the core apart into tight contact with the fitting sections. The latter are then separated by a space 73. The cross sectional area of the core, when expanded, is such that the adjacent edges of the section 70 are spaced apart at 74 a distance approximately equal to the wall thickness of sections 70. The core section 65 is provided with a lengthwise groove 75 which underlies space 74 at one side of the fitting and is of appreciably greater width than such space. Section 66 of the core is provided with a groove 76 which underlies the space 74 at the other side of the fitting sections and is of appreciably greater width than the latter space. Block 71 is provided with beveled surfaces 71$^a$, 71$^b$ and 71$^c$, block 72 being provided with corresponding beveled surfaces 72$^a$, 72$^b$ and 72$^c$, these beveled surfaces of the clamping blocks permitting ready access to the projecting edge portions of the fitting or elbow 70 for welding together thereof. Sections 70 of the elbow are welded together with excess of weld metal projecting beyond the inner and the outer surfaces of the fitting, which excess metal is ground away removing all impurities from the weld metal and leaving the sections 70 united by a body of pure and non-porous metal of the same character as that of the fitting sections, as previously described.

Each of the wedges 68 is provided with an opening 77 through its outer portion, which opening receives a wedge plate 78 provided with stop pins 79 and 80. One edge of plate 78 bears upon the ends of the core sections 65 and 66 so that by driving this plate through the wedge 68, the latter may be moved outward sufficiently so as to be readily withdrawn from between the core sections 65 and 66, opening 77 being of proper extent for that purpose.

Preferably the sectional form or core about which the fitting sections are disposed, during the welding operation, is of solid copper, in both forms of cores illustrated, being highly efficient as chill blocks during the welding operation. The cores may be made of any other suitable material, though copper is preferred. It will be understood that the construction and form of the core may vary in accordance with the form of the fittings to be produced, and that my invention is applicable to fittings of various forms other than those herein illustrated by way of example.

While I have disclosed certain preferred forms of my invention, it will be understood that changes therein may be resorted to without departing from the field and scope thereof, and I intend to include all such variations, as fall within the scope of the appended claims, in this application in which the preferred forms only of my invention have been disclosed.

I claim:

1. The method of producing wrought fittings from metal of the character of stainless steel, which comprises stamping fitting sections of wrought metal, assembling the sections in edgewise spaced relation with a chilling backing member at the inner surface of the sections having grooves extending along and in back of the spaces between the opposed edges of the sections, the respective spaces between the edges of said sections being of a width sufficient to permit free flow therethrough of molten weld metal and the grooves being of a depth to receive excess weld metal in amount to contain slag and other impurities produced incident to the welding operation, butt welding the edges of said sections together by metal additional to and of the same character as that of said sections, with excess of weld metal projecting beyond the inner surface of the assembled fitting into said grooves and excess of weld metal projecting beyond the outer surface of the assembled fitting, in amount such that slag and other impurities produced incident to the welding operation are segregated from the pure weld metal, in the excess weld metal projecting beyond the inner and the outer surfaces of the fitting, removing the backing member, and grinding off the excess weld metal thereby removing the contained impurities and leaving the fitting sections united by pure non-porous weld metal of the same character as the metal of the fitting sections.

2. The method of producing wrought fittings from metal of the character of stainless steel, which comprises forming fitting sections of wrought metal, assembling the sections in edgewise spaced relation with a chilling backing member at the inner surface of the sections having grooves extending along and in back of the spaces between the opposed edges of the sections, said backing member being otherwise in continuous contact with the inner surfaces of said sections, the respective spaces between the edges of said sections being of a width sufficient to permit free flow therethrough of molten weld metal and the grooves being of a depth to receive excess weld metal in amount to contain slag and other impurities produced incident to the welding operation, butt welding the edges of said sections together by metal additional to and of the same character as that of said sections, with excess of weld metal projecting beyond the inner surface of the assembled fitting into said grooves and excess of weld metal projecting beyond the outer surface of the assembled fitting, in amount such that slag and other impurities produced incident to the welding operation are segregated from the pure weld metal, in the excess weld metal projecting beyond the inner and the outer surfaces of the fitting, removing the backing member, and grinding off the excess weld metal thereby removing the contained impurities and leaving the fitting sections united by pure non-porous weld metal of the same character as the metal of the fitting sections.

WALTER J. WACHOWITZ.